Sept. 15, 1964         T. A. MITCHELL            3,148,890
                          DRILL CHUCK
                       Filed Nov. 13, 1962
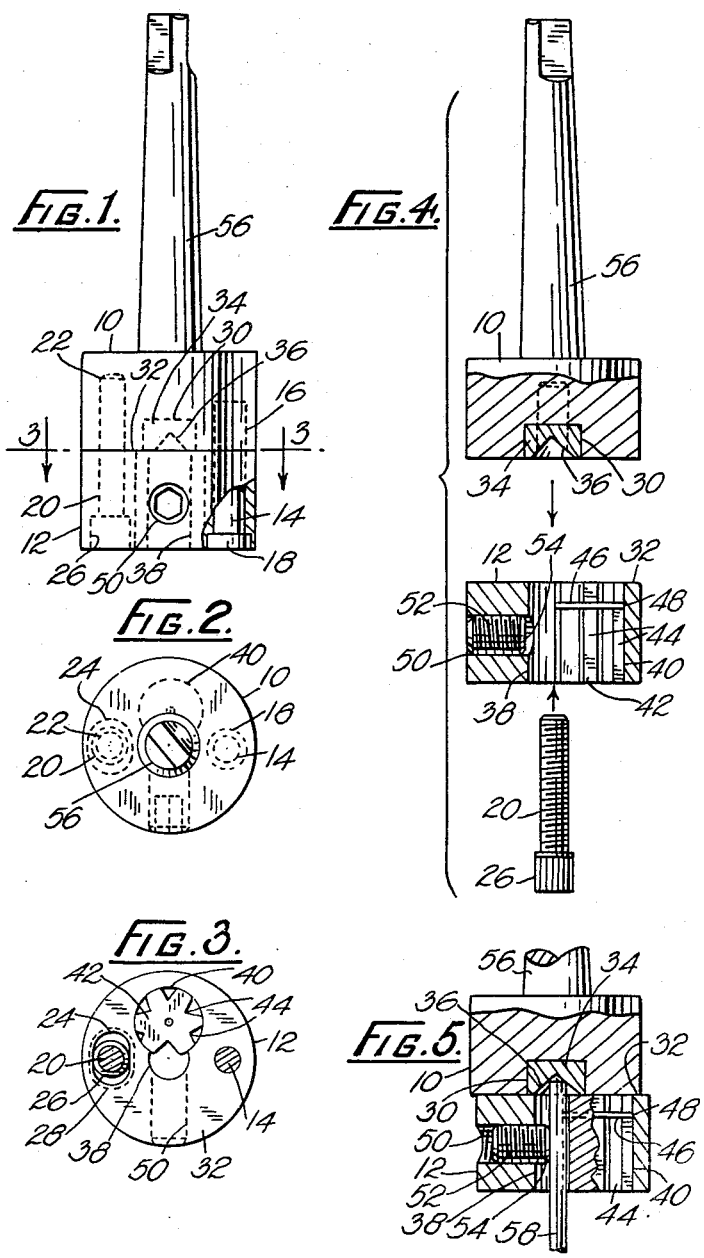
INVENTOR
THOMAS A. MITCHELL

United States Patent Office 3,148,890
Patented Sept. 15, 1964

3,148,890
DRILL CHUCK
Thomas A. Mitchell, 11 Arlington Mansions, Corner Kerk and Loveday Sts., Johannesburg, Transvaal, Republic of South Africa
Filed Nov. 13, 1962, Ser. No. 236,808
Claims priority, application Republic of South Africa, Nov. 21, 1961, R 61/2,490
7 Claims. (Cl. 279—14)

This invention relates to chucks for drills and like round shanked tools.

Chucks at present in use are apt to be complex and correspondingly expensive and liable to be damaged in use. The object of this invention is to provide a chuck which has advantages over known chucks in respect of first cost and resistance to damage and which is efficient in use.

According to the invention, the chuck consists in a cylindrical body, an axial, blind hole in the body terminating at its blind end in a conical recess, a core mounted for rotation in an eccentric bore in the body that is parallel with the hole and intersects it, the core being formed peripherally with a series of longitudinal grooves of progressively increasing size; a means to clamp a drill shank in the bore in engagement with one of the grooves of the core; and an axial shank on the body projecting from the lateral face remote from the face at which the blind hole opens.

The body is composed of two cylindrical parts, and means is comprised connecting the parts together in approximately axial alignment, the conical recess being in the first part and the core in the second part. This enables any one of a large number of drills within a wide range to be chucked.

The two forms of the invention are illustrated in the accompanying drawings in which FIGURE 1 is a side view, partly sectioned of the first form;

FIGURE 2 is a plan view;

FIGURE 3 is a horizontal section on the line 3—3 of FIGURE 1;

FIGURE 4 is an exploded, partly sectioned, side view, with the connecting pin removed; and FIGURE 5 is a fragmentary vertical section through the chuck.

In FIGURES 1 to 5 of the drawings the body of the chuck consists in two cylindrical parts 10, 12 which are loosely connected together (in the sense that relative lateral movement can occur) by a cylindrical pin 14, the shank 16 of which is a press fit in a bore in the part 10 displaced from the axis of that part parallel with the axis. The pin extends through a registering bore in the part 12 and constitutes a pivot about which the part 12 can rotate. The pin may be formed with a head 18 that is accommodated within a counterbore in the part 12, to constrain the parts 10, 12 against relative endwise movement.

The extent of relative lateral movement permitted to the parts 10, 12 is determined by a screw 20 that is screwed into a screw-threaded socket 22 in the part 10, through the part 12. The hole 24 in the part 12 through which the screw 20 passes is oval so that the part 12 is allowed limited pivotal movement around the pin 14, the extent of which is determined by the dimension of the oval hole 24. The parts are locked together against such relative lateral movement when the screw 20 is tightened to bring its head 26 against the shoulder 28 in the hole 24.

A blind hole 30 is bored axially within the part 10 from the face 32 that is in contact with the part 12. A plug 34 is driven into the hole 30. The plug is formed with a conical recess 36. As the centricity of the chuck is entirely dependent upon the precise location of the recess, it is essential that the hole 30 and the plug 34 be very accurately machined.

The part 12 is axially bored at 38 and there is also an eccentric bore 40 that intersects the bore 38 (FIGURE 3). Within the eccentric bore 40 is rotatably mounted a core 42 that is formed in its periphery with a series of V-shaped longitudinal grooves 44 of progressively increasing size. The core is restrained against endwise movement in the bore 40 by a circlip 46 that is engaged in a circumferential slot in the core and that bears frictionally against the wall of the bore.

Diametrally opposite the bore 40 is a transverse, screw-threaded hole 50 into which is screwed a grub-screw 52 with a flat end 54.

The part 10 is provided with a shank such as 56 to connect it to a drilling machine.

In use, the screw 20 is slackened off to permit relative lateral movement of the parts 10 and 12, the grub-screw 52 is, if necessary, retracted away from the hole 38, and the core 42 is rotated to bring a groove 44 appropriate to the size of drill to be chucked into opposition with the bore 38. It is pointed out that each groove caters for a range of drills extending to each side of a norm, which is the drill the diameter of the shank of which is such that, when the shank is engaged within the groove, the drill axis exactly coincides with the axis of the body part 10.

A drill 58 (FIGURE 5) is then inserted into the bore 38 and pressed hard into the recess 36 to ensure that it is axially located. The grub-screw 52 is then tightened to bear against the drill shank, as shown in FIGURE 5. This locks the drill within the chuck. The circlip 46 is discontinuous, as shown in FIGURE 9 to leave a gap which spans the hole 38, so that the circlip does not obtrude into the hole to obstruct the drill 58 as it is passed into the chuck. The frictional engagement of the circlip against the wall of the bore maintains the circlip against rotation.

If the drill is the norm of the range, as set out above, the clamping of the shank, with the end of the drill centralized by the conical recess 36, results in the two body parts 10, 12 being axially aligned. However, if the drill shank diameter deviates from the norm, clamping of the shank results in the body part 12 pivoting about the pin 14 to a position somewhat out of alignment with the part 10, since the shank end is axially fixed by the conical recess 36 and the groove walls dictate that the shank be parallel with the axis of the part 10. The extent of misalignment depends upon the deviation of the drill from the norm.

It will now be apparent why it was observed above that each groove is designed to cater for a range of drill sizes. The extent of pivotal movement of the part 12 is limited by the play allowed between the screw 20 and the oval hole 24. The depth of the groove selected must therefore be such that the drill shank is able to lie in contact with the walls of the groove and be parallel with the axis of the core when the shank is clamped. This condition is possible only if the extent of misalignment imposed on the part 12 by clamping of the grub-screw 52 is within the range permitted by the screw 20.

The practical effect of clamping a drill shank that deviates from the norm is seen in FIGURE 5, in which the misalignment has been exaggerated for clarity. It will be noted that the drill end is axially located by the conical recess 36 and that the drill is held parallel to the axis of the part 12 by the wall of the groove 44. The drill is thus axially held relatively to the part 10 and the shank 56 and will run truly with the part 10.

It will be observed that the misalignment of the parts 10, 12 will affect the dynamic balance of the chuck. This would exclude the use of the chuck for high-speed drilling except when drills of the norm for any groove are used, when there is no misalignment; but the misalignment is insufficient to be detrimental for low-speed drilling, for instance for hand drills.

One the point of dynamic balance, the chuck will, of course, be made with a hole or holes to remove the weight of metal necessary to bring the chuck into dynamic balance when the parts 10, 12 are aligned.

The number of ranges of drill sizes which the chuck can accept is pre-determined by the number of grooves 44 in the core 42. As illustrated, there are six grooves, but eight could be accommodated. For other size ranges, the core 42 may be withdrawn and replaced by other cores grooved to conform to the required ranges. Thus, with a single chuck body and several cores, a full range of drill sizes can be catered for up to the diameter of the bore 38.

Finally, the screw 20 is tightened to ensure that no relative lateral movement of the chuck body parts 10, 12 occurs.

A special advantage of the chucks of the invention is that they are mechanically uncomplicated and therefore are robust and can be cheaply produced. Furthermore they are easy to manipulate. The operation consists merely in selecting the correct groove and then clamping the drill by tightening the two screws 20 and 52.

I claim:
1. A chuck comprising a body composed of two cylindrical parts, means loosely connecting the parts together end to end in approximately axial alignment and so as to permit the parts relative lateral movement, means to clamp the parts against such lateral movement, an axial conical recess in the first part within the lateral face of the part that is directed towards the second part, an axial shank projecting from the other lateral face of the first part, an axial hole through the second part, a core mounted for rotation in an eccentric bore in the second part that is parallel with the axial hole and intersects it, the core being cylindrical and formed peripherally with a series of longitudinal grooves of progressively increasing size; and a means to clamp a drill shank in the hole in engagement with one of the grooves of the core.

2. The chuck of claim 1 in which the grooves in the core are V-shaped, and of progressively greater depth and angular extent.

3. The chuck of claim 1 in which the means to clamp the two parts of the body together consists in a screw extending through a hole in one part and screwing into the other part, the hole being of greater diameter than the diameter of the screw.

4. The chuck of claim 1 in which the means connecting the parts together consists in an eccentrically mounted pin fast with an projecting from one part and passing through the other part and on which the other part is rotatable.

5. The chuck of claim 4 in which the outer end of the pin is formed with a head to constrain the parts against relative endwise movement while permitting them relative lateral movement.

6. A chuck comprising a body composed of two cylindrical parts, a pin connecting the parts together end to end, the pin being parallel to but eccentric to the axes of the parts and at least one of the parts being rotatable about the pin, a screw to clamp the parts together against relative lateral movement engaged with one part and passing through an orifice in the other part of greater diameter than the diameter of the screw, an axial hole through the first part, an axial conical recess within the second part open to the axial hole, a bore in the second part parallel with an intersecting the axial hole, a cylindrical core mounted for rotation within the bore and formed peripherally with a series of longitudinal grooves of progressively increasing size, a screw-threaded cross bore in the second part intersecting the axial hole, a clamping screw within the cross bore for clamping an element in the axial hole in engagement with one of the grooves of the core, and an axial shank projecting from the first part in the direction away from the second part.

7. The chuck of claim 6 in which the pin is fast with one part and is formed with a head that constrains the connected parts against relative endwise movement.

References Cited in the file of this patent
UNITED STATES PATENTS

| | | |
|---|---|---|
| 70,112 | Peirce | Oct. 22, 1867 |
| 621,624 | Thompson | Mar. 21, 1899 |
| 1,693,823 | Shore | Dec. 4, 1928 |